United States Patent
Morrissey

(10) Patent No.: US 8,465,102 B2
(45) Date of Patent: Jun. 18, 2013

(54) CHILD SAFETY SEAT MAGNETIC WEB ATTACHMENT

(76) Inventor: Brian James Morrissey, Newburgh, IN (US)

( * ) Notice: Subject to any disclaimer, the term of this patent is extended or adjusted under 35 U.S.C. 154(b) by 0 days.

(21) Appl. No.: 12/661,624

(22) Filed: Mar. 22, 2010

(65) Prior Publication Data

US 2011/0227392 A1  Sep. 22, 2011

(51) Int. Cl.
*A47D 15/00* (2006.01)
*B60N 2/24* (2006.01)

(52) U.S. Cl.
USPC ........................................ 297/484; 297/250.1

(58) Field of Classification Search
USPC .................. 297/216.11, 484, 250.1
See application file for complete search history.

(56) References Cited

U.S. PATENT DOCUMENTS

| 6,305,745 B1 * | 10/2001 | Rijsdijk | 297/250.1 |
| 6,662,413 B2 * | 12/2003 | Glover | 297/484 |
| 2011/0133528 A1 * | 6/2011 | Keith et al. | 297/216.11 |

FOREIGN PATENT DOCUMENTS

JP    2001158263 A  *  6/2001

* cited by examiner

*Primary Examiner* — Anthony D Barfield
(74) *Attorney, Agent, or Firm* — Gary K. Price

(57) ABSTRACT

The present invention provides a child safety seat installed within a motor vehicle, including both upper portions of a harness web threaded through a pair of sleeves surrounding that portion of the web proximate a child's chest area. It is an object of this invention to eliminate the disadvantages of the harness webs, tangs and buckle, falling into the depression or concavity formed by the contours of the seat, interfering with placing a child within the seat. The upper portions of both webs are required to be connected laterally to offer protection against separation in the event of a sudden deceleration. The sleeves therefore include a latchable connector to selectively couple or uncouple one sleeve to another.
A magnet is positioned upon each sleeve, and metallic strips embedded within the seat sides.
Thereby when sleeves are in an uncoupled position, each sleeve may be repositioned and inverted toward an adjoining lateral seat edge, whereby the magnets and metallic strips are attracted and fasten in releasable attachment, by this means maintaining the web harness clear of the interior of the seat. A handle is provided attached to a lower buckle, providing a grasping and manipulating opportunity to store the buckle assembly outside an interference zone.

16 Claims, 3 Drawing Sheets

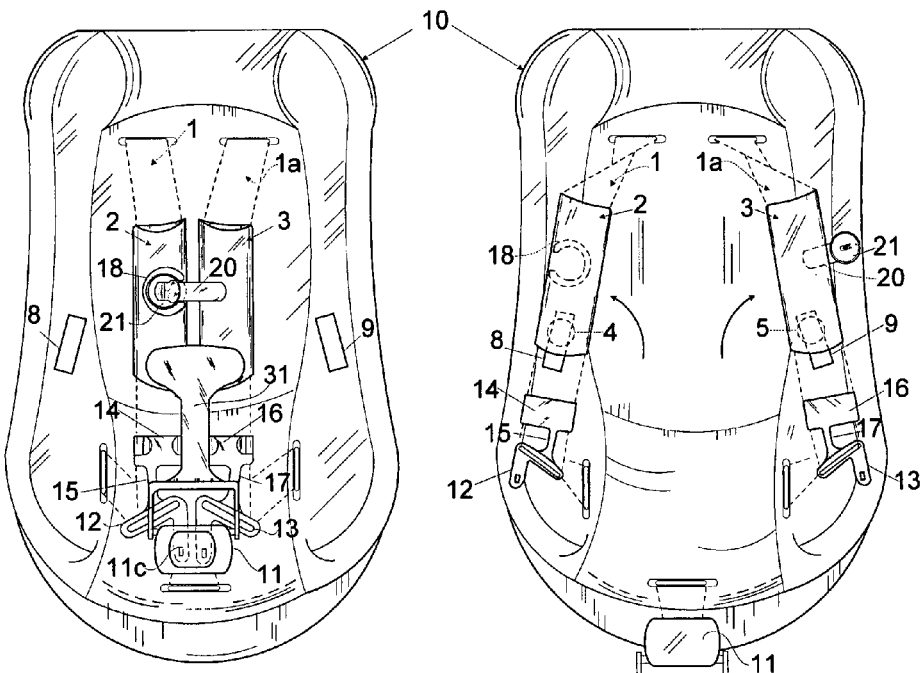
FIG. 1   FIG. 2
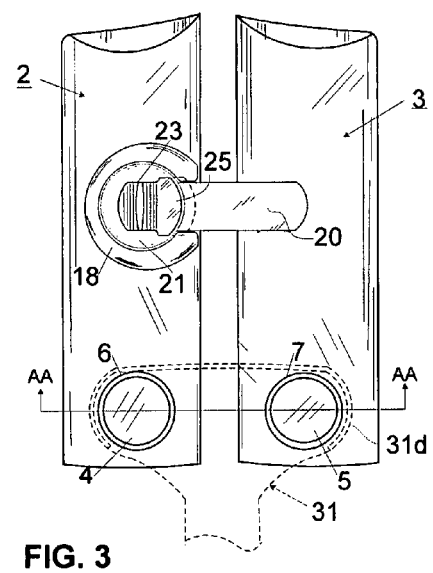
FIG. 3
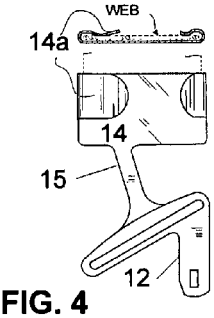
FIG. 4
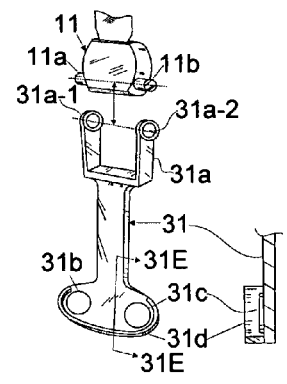
FIG. 5 Enlarged View 31E-31E

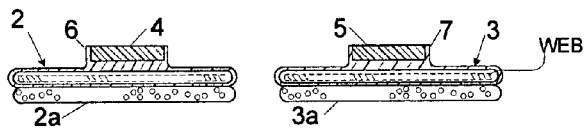
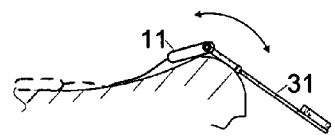
FIG. 6
FIG. 7
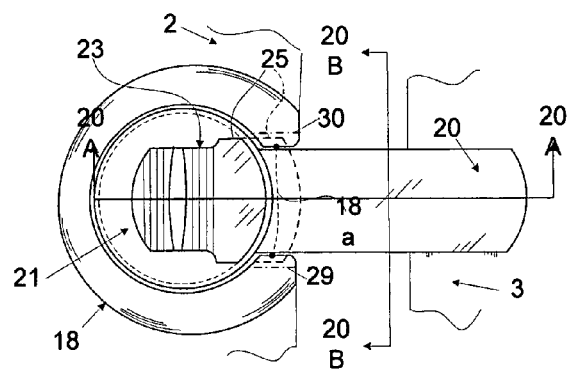
FIG. 8
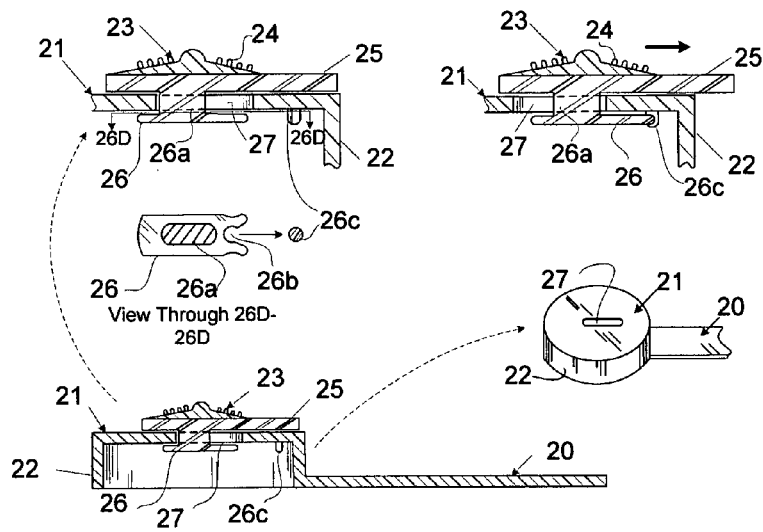
FIG. 9 Enlarged View Through 20A-20A
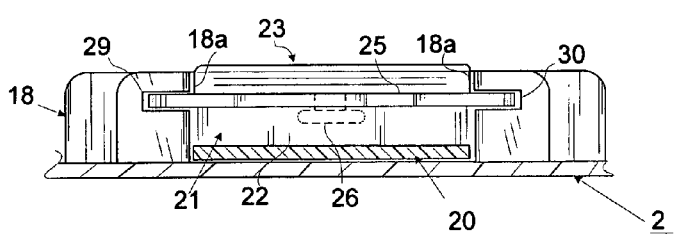
FIG. 10 Enlarged View Through 20B-20B

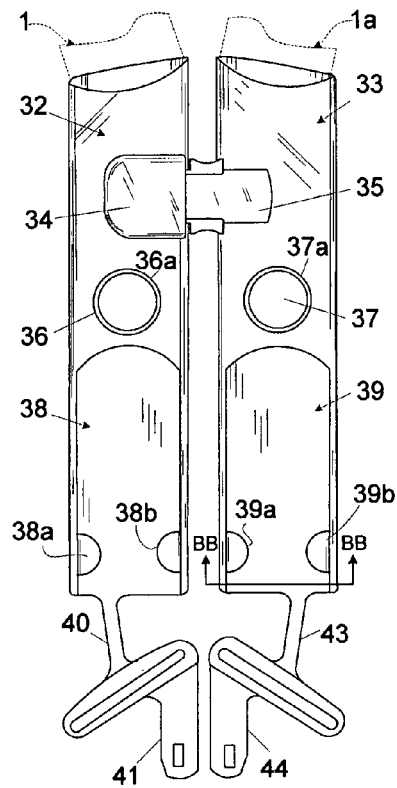
FIG. 11
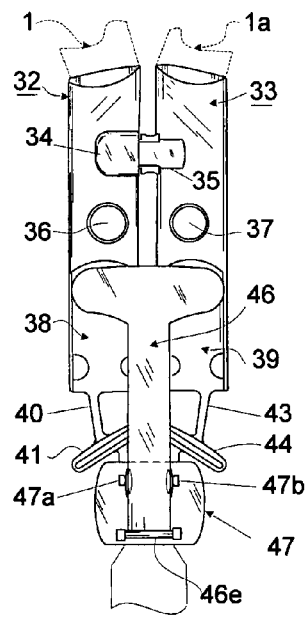
FIG. 11a
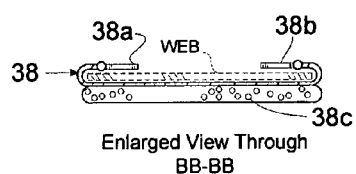
FIG. 12
Enlarged View Through BB-BB
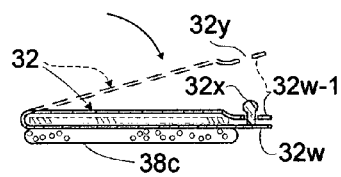
FIG. 14
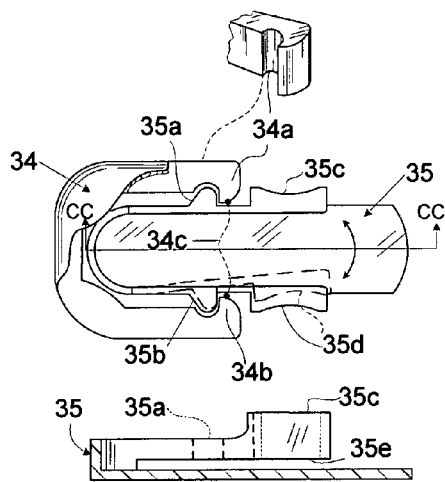
FIG. 13   View Through CC-CC
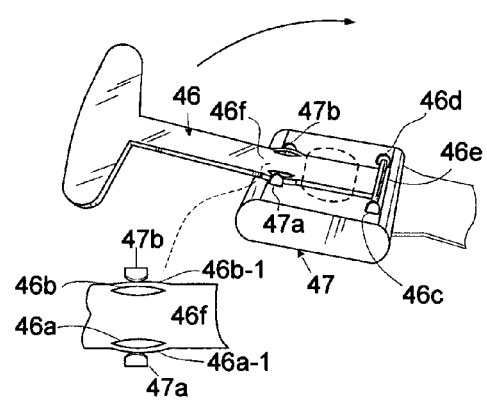
FIG. 15

CHILD SAFETY SEAT MAGNETIC WEB ATTACHMENT

BACKGROUND OF THE INVENTION

In the use of current child safety seats within a motor vehicle, a child is restrained in a five point safety harness. This harness is connected to anchor points on the upper and lower portions of a safety shell.

The harness has two web members extending from the upper portion of the seat, placed over a child's shoulders. Each web is connected laterally at a point, one to another, proximate the child's chest area.

At the lower portion, the webs are connected at a second position at a buckle, achieved through placing a pair of tangs, attached to each web, into the buckle.

To remove a child from the harness, both the upper and lower connections are disconnected.

As a result of disconnecting the stated harness web connections and removing a child, the webs and attached connectors fall within a depression or concavity formed by the contours of the seat.

The seat contours are such that the lower buckle also falls into this depression.

As a result of the position of these webs within the seat, a child, when replaced within the seat, is placed over the webs and attachments, covering them.

This necessitates reaching into the seat depression to locate, and retrieve each web from underneath the child, requiring moving and possible discomfort of the child.

The same is true when locating and retrieving the tangs and buckle from underneath the child.

These actions require the adult to spend additional time, mostly with the vehicle door open, often in inclement or hot weather, to correctly install a child safely within the safety seat.

It is an object of this invention to eliminate the disadvantages of the harness webs, tangs and buckle, falling into the depression or concavity formed by the contours of the seat.

It is a further object of this invention to make placing, or removing a child from a safety seat easier and less intrusive.

It is yet another object of this invention to interpose between a child and the aforementioned sleeves, a foam or gel like material to enhance the safety and comfort of a child.

FIELD OF THE INVENTION

The present invention relates to a harness assembly set within a child's safety seat within a motor vehicle.

SUMMARY OF THE INVENTION

In a first embodiment the present invention accordingly provides a child safety seat installed within a motor vehicle, in particular including both upper portions of a harness web threaded through a pair of sleeves surrounding that portion of the web proximate a child's chest area, manufactured from a suitable flexible, soft plastic.

The sleeves are sized to fit over the web so that frictional contact between the interior of the sleeve, and the mating surface of the web, is sufficient to hold a sleeve in a preset position on the web.

Each sleeve has a backing member of a foam or gel like material interposed between a child and each sleeve. To simplify terms, the following may be helpful.

This area of a sleeve, facing inward toward the seat, is referred to as the underside.

The opposite area, facing outward from the seat, is referred to as the topside.

A magnet is positioned upon the topside of each aforementioned sleeve. This magnet is embedded within a circular plinth. The upper portions of both webs are required to be connected laterally to offer protection against separation in the event of a sudden deceleration. Connecting members are therefore provided on both sleeve topside, having one portion attached to one sleeve, and a second portion attached to the other sleeve.

The lower portions of the web harness are connected at a buckle, achieved through inserting a pair of tangs into the buckle. Each tang is free to move along its web, and falls into the depression within the seat as stated previously. To counteract this, the tang is attached by a narrow strap to a web clamp, securing the tang at a desired position along the web.

A handle is attached to a buckle mechanism by two pivot points located each side of the face of the buckle. The handle is free to rotate around the buckle where, in a first position it is in a closed, secured, position. It is rotated through a second, open position. In this second, open position, the added length of the handle to the buckle mechanism extends over the seat edge providing a grasping opportunity. This extension further assists in retaining the position of the buckle, the handle forming a cantilever extension (FIG. 7) and by the contour of the seat edge falling away at that point, and allowing further downward rotation of the handle. This captures the buckle outside the area of the seat depression, where it may be manipulated by the handle and returned into a desired original position when required to reinsert the tangs.

Further assisting this insertion process, the tangs are attached to web clamps, by a narrow strip, allowing some flexibility of movement of the tang without having to alter the position of the web clamp.

The distal end of the handle has a tee shape configuration, having a metallic disc attached near each end, positioned to locate and attach to aforementioned sleeve magnets in a first closed position.

A protruding flange surrounds the metallic discs area, and is intended to surround and enclose portions of the aforementioned magnet plinths, offering a secondary protection against a lateral separation of the webs.

A metallic strip is embedded within each side of the seat proper, proximate the chest/shoulder area of a child, and enclosed by a material isolating contact with a child, yet allowing magnetic attraction when coupled to aforementioned sleeve magnets.

These longitudinally placed metallic strips are sized to accommodate a range of adjustments of the sleeves made over time. It is intended that the position of the sleeves and web clamps relative to the harness web be adjusted to suite the child using the safety seat. This setting will place the metallic discs in the handle to contact the sleeve magnets, and seat side metallic strips. Further adjustment will only be required as the child grows.

In a second embodiment the present invention accordingly provides a child safety seat installed within a motor vehicle, including both upper portions of a harness web threaded through a pair of sleeves surrounding that portion of the web proximate a child's chest area, manufactured from a suitable flexible, soft plastic.

The sleeves are sized to fit over the web so that frictional contact between the interior of the sleeve, and the mating surface of the web, is sufficient to hold a sleeve in a preset position. The sleeves proper terminate at an approximate midpoint along the length, and transition into an open web guide member, being enclosed on each side by a narrow curled flange, (FIG. 12) terminating in an integral strip attached to a web tang.

On the underside each sleeve is fitted with a backing member of a foam or gel like material interposed between a child, and the underside of the sleeve and sleeve guide member.

The upper portions of both webs are required to be connected laterally to offer protection against separation in the event of a sudden deceleration. Connecting members are therefore provided on both sleeve topside, having one portion attached to one sleeve, and a second portion attached to the other sleeve.

A magnet is positioned upon the topside of each aforementioned sleeve. This magnet is embedded within a circular plinth.

A handle is attached to a buckle mechanism by two pivot points located on the face of the buckle. The handle is free to rotate around the buckle where, in a first position, it is in a closed, secured, placement. It is rotated through a second, open position. In this second, open position, the adding length of the handle connected to the buckle mechanism extends over the seat edge providing a grasping opportunity. This extension further assists in retaining the position of the buckle by the contour of the seat edge falling away at that point, and allowing further downward rotation of the handle. This captures the buckle outside the area of the seat depression, where it is manipulated by the handle into a desired original position to reinsert the tangs. Further assisting this insertion process, the tangs are attached to web guide member, having a narrow strip attached, allowing some flexibility of movement of the tang without having to alter the position of the sleeves and web guides.

Two protuberances, (FIG. 15) spaced apart on the buckle, placed away from the pivot points, locate the handle stem, each side cooperating with two protruding areas set within the handle stem sides, causing compression of the protruding areas, thereby securing the handle within the aforementioned protuberances.

Each sleeve may be provided with a flange placed along the length of the sleeve (FIG. 14) that it may separate an underside member from a topside member. In this open configuration the sleeve may be slid over a web length. Each flange would be connected together, by inserting spaced apart bulbous members through cooperating sized holes, providing a completely enclosing sleeve.

BRIEF DESCRIPTION OF THE DRAWINGS

The embodiment of the present invention will be illustrated by reference to the following drawings.

FIG. 1 is a frontal view of a harness web attachment in a fastened, closed and secured position according to the present invention.

FIG. 2 is a frontal view of a harness web attachment in an unfastened, open and stored position according to the present invention.

FIG. 3. is a enlarged view of a sleeve portion attached to a harness web attachment, including a connection device, and magnet placements.

FIG. 4, FIG. 5, FIG. 6. show detailed views of various parts used within the embodiment of the present invention.

FIG. 7 indicates a stored position of a buckle with connected handle.

FIG. 8, FIG. 9, and FIG. 10, are various detailed views of a connecting member.

FIG. 11, and FIG. 11a, illustrates a frontal view of a second embodiment of this present invention Illustrating harness web sleeves attached to a harness web. Also shown are placements of a connecting device, magnets and handle.

FIG. 12, and FIG. 14 are sections through sleeves.

FIG. 13 is a plan and section through a connecting member.

FIG. 15 is a perspective view of an attached handle and a fastening method.

DESCRIPTION OF THE PREFERRED EMBODIMENT

FIG. 1 and FIG. 2 shows a child's safety seat with a five point web harness as found in conventional safety seats fitted within a motor vehicle. The upper shoulder straps 1 and 1a are enclosed within a pair of sleeves 2 and 3, fitted such as frictional contact between the interior of the sleeve and the web hold the sleeve in a pre selected position.

Positioned on the lower portion of sleeves 2 and 3, are two magnets 4 and 5, (FIG. 3/FIG. 6) facing topside, are set within plinths 6 and 7. These magnets may be covered by a thin membrane (not shown) to prevent access by a child.

Two metallic strips 8 and 9 are embedded within each side of the seat proper 10, proximate the chest/shoulder area of a child, and enclosed by a material isolating contact with a child, yet allowing magnetic attraction when coupled to aforementioned sleeve magnets 4 and 5 (This connection explained fully later)

These longitudinally placed metallic strips are sized to accommodate a range of adjustments of the sleeves made over time. It will be noted that magnetic strips may be substituted for metallic strips 8 and 9.

FIG. 4. The lower portions of the web harness are connected at a buckle 11, achieved through inserting a pair of tangs 12 and 13 into buckle 11. Each tang is free to move along its web 1, and 1a and falls into the depression within the seat as stated previously. To counteract this, tang 12 is attached to a web clamp 14 by narrow strip 15, similarly tang 13 is attached to web clamp 16 by narrow strip 17, securing the tangs to a desired position along the web. To position web clamp 14 along web 1, an attached clip 14a, is lifted slightly, relieving compression on web 1, allowing web clamp 14 to slide along web 1.

The same adjustment applies to web clamp 16. Narrow strips 15 and 17 enable some freedom of movement to insert the tangs 12 and 13, into buckle 11 without adjusting the positions of web clamps 14 and 16.

FIG. 8, FIG. 9, FIG. 10. The upper portions of both webs 1 and web 1a are required to be connected laterally to offer protection against separation of the webs in the event of a sudden deceleration.

Two portions of a connecting mechanism are therefore provided, both positioned on the topside of sleeves 2 and 3. Attached to sleeve 2 a circular wall 18, is provided with an open area 18a, positioned adjacent to a similarly positioned connector 20 located and connected on sleeve 3.

The distal end of connector 20 has a circular member 21 with a descending encasing flange 22, sized to fit closely within circular wall 18. Contained on circular member 21, having an outer facing area, and an inner facing area, a slide 23 is fitted to the outer facing area, having on one end a finger grip 24, the distal end having a protruding planer member 25 and a descending elongated connector 26a, engaged within slot 27, terminating in an elongated flange 26, (now within the inner facing area) with one end having a tapered opening 26b. At the end of its travel, elongated flange 26, and tapered opening 26b springs apart and snaps back engaging descending protrusion 26c, requiring additional finger force to fully engage these members. (The resulting pressure required to secure or retract slide 23 would therefore be greater than a child could produce to eliminate accidental opening)

Slide 23 is used to alternate positions between a first retracted position, and a second extended position, whereby planer member 25 is engaged within circular wall 18.

FIG. 10 illustrates circular member 21 fitted within circular wall 18, having opening 18*a* providing a slot 29 one end and slot 30 the opposing end, cooperating to engage planer member 25 when positioned in the extended position, thereby securing circular member 21 within circular wall 18. In this configuration, lateral force applied to sleeves 2 and 3 will be resisted by the interaction between circular member 21, captured within circular wall 18.

As previously stated buckle 11 will fall into a position underneath a child in a conventional safety seat. Therefore this invention provides an attached handle 31 providing a grasping opportunity to locate and manipulate buckle 11 to a desired storage position.

FIG. 5 illustrates such a handle 31 having on one end a yoke 31*a*, terminating in pivotal connectors 31*a*-1, and 31*a*-2, with the distal end having two metallic discs, 31*b* and 31*c*, surrounded by an ascending flange 31*d*. Handle 31 is rotoratably connected to Buckle 11 through interaction with pivot points 11*a* and 11*b*, inserted into connectors 31*a*-1, and 31*a*-2.

It may be beneficial to describe the actions required to position the elements of the present invention in a first, closed, fastened position, to secure a child within a safety seat. And to further describe a second, open, unfastened and stored position required to remove a child from a safety seat, and prepare the elements of this present invention positioned such as to more easily replace a child within the seat.

After placing a child within a safety seat, web 1 and 1*a*, being overlaid with sleeves 2 and 3 are placed over a child's shoulders, with sleeves 2 and 3 positioned at a child's chest area.

Connector 20, attached to sleeve 3, positions circular member 21 proximate circular wall 18, on sleeve 2, whereupon circular member 21 is inserted into circular wall 18.

At this point slide 23, set upon circular member 21, is in a retraced position, and offers no interference to the insertion process. (FIG. 9) Placing a finger on finger member 24, and applying a small force in the direction of sleeve 3, move slide 23, together with planer member 25, toward the open area of circular wall 18*a*. Planer member 25 (FIG. 10) is inserted into slot 29 on one side of open area 18*a*, and into slot 30 on the opposite side. This action also moves elongated flange 26 and tapered connector 26*b* toward descending protrusion 26*c*. Applying additional force, protrusion 26*c* is captured within tapered connector 26*b*. Circular member 21 is now secured within circular wall 18 thereby securing sleeves 2 and 3 together. At a lower point, buckle 11 is positioned and tangs 12 and 13 are inserted and secured within buckle 11. Handle 31 (FIG. 1) is located and rotated upwards toward the lower portion of sleeves 2 and 3, whereupon metallic disc 31*b* is attracted to magnet 4, and metallic disc 31*c* is attracted to magnet 5, connecting and attaching in a releasable yet secured connection.

Ascending flange 31*d* is covering portions of magnet plinths 6 and 7 in close proximity, restricting lateral movement, thereby providing secondary protection against lateral forces separating sleeves 2 and 3.

At this point a child is securely seated within the five point safety harness seat utilizing the components of this present invention, The procedure for removing a child from the safety seat is as follows:

Handle 31 is lifted, breaking the magnetic connection between magnet 4 and metallic disc 31*b* and magnet 5, and metallic disc 31*c*. The handle 31 is rotated through approximately 180 degrees, giving access to a push button 11*c*, whereby tangs 12 and 13 are removed from buckle 11.

FIG. 8. Using slide 23 to retract planer member 25 breaking a connection from within circular wall slots 29 and 30, frees circular member 21 from within circular wall 18, wherein circular member 21 is lifted out and removed, thereby separating sleeve 2 from sleeve 3.

Sleeve 2 (FIG. 2) is inverted as it is lifted free of a child and moved toward the outside edge of seat 10. Sleeve 2, together with magnet 4, now being inverted or turned over is positioned over metallic strip 8. Magnet 4 is attracted to, and makes contact thereby attaching sleeve 2 to the side of the seat 10.

Web 1 is now in a stored position along an upper outer aspect of seat side 10, prevented from falling into the seat depression as described previously through the interaction of metallic strip 8, and magnet 4. Web clamp 14 connected to tang 12, through narrow strip 15 is also secured to the side of the seat 10, connected by web 1 through interaction with sleeve 2 and the magnetic connection so formed.

The same method is used to reposition sleeve 3, connecting magnet 5 with metallic strip 9, therefore securing web 1*a*, with web clamp 16 and tang 13 also captured in a stored position.

FIG. 6. The underside of both sleeves 2 and 3 are visible, revealing a foam or gel like material 2*a* and 3*a* attached to sleeves 2 and 3, offering additional protection in the event of a sudden deceleration of a vehicle, to enhance the safety and comfort of a child.

FIG. 2. Handle 31 being rotated to a lower point, attached to buckle 11, is grasped and pulled further in a downward direction, such that buckle 11 is pulled away from the previously described seat depression, toward an outer lower edge of seat 10. Buckle 11, with handle 31 (FIG. 7) acting as a cantilever, is positioned and stored at a seat edge, away from interference with extracting the child, yet available for grasping when next required.

At this point, all the elements provided for by this present invention are captured and positioned on seat 10 as illustrated in FIG. 2, giving a unobstructed space in which to place and more easily secure a child within seat 10.

FIG. 11 In a second embodiment of the present invention, providing a similar operating function to the preferred embodiment, accordingly provides a child safety seat installed within a motor vehicle, including both upper portions of a harness web designated by the numerals 1, and 1*a* in the aforementioned preferred embodiment, threaded through a pair of sleeves 32 and 33 surrounding that portion of the web proximate a child's chest area, manufactured from a suitable pliable, soft plastic.

Sleeves 32 and 33 are sized to fit over webs 1 and 1*a* so that frictional contact between the interior of the sleeve, and the mating surface of the web, is sufficient to hold a sleeve in a preset position.

Sleeve 32 terminates at an approximate midpoint along the length and transitions into an open web guide member 38, sleeve 33 similarly transitions to open guide member 39.

FIG. 12 Guide member 38 is enclosed on each side by a narrow curled flange, with projections 38*a* and 38*b* providing additional web securing. The distal end terminating in an integral strip 40 attached to a web tang 41. Guide member 39, with projections 39*a* and 39*b*, are likewise attached to integral strip 43, together with web tang 44.

On the underside of sleeves 32 and 33 continuing through the underside of guide member 38 and 39 a backing member 38*c*, is attached, manufactured from a foam or gel like material, along the total length, providing some additional comfort and protection to a child secured within the seat.

After placing a child within a safety seat, designated in the preferred embodiment by the numeral 10 web 1 and 1a, being overlaid with sleeves 32 and 33 are placed over a child's shoulders, proximate a child's chest area.

FIG. 11a depicts the previous description of FIG. 11 with the addition of a handle 46, attached to a buckle 47, overlaying a portion of the sleeves 32 and 33, and web guides 38 and 39.

The operation of handle 46, with buckle 47 may be better explained by reference to FIG. 15.

Provided on buckle 47, are two protuberances 47a and 47b set near an edge, spaced apart to accommodate a stem portion 46f of handle 46. An upper end of handle 46 terminates in a tee type member, the distal end terminating in a round shaft like member 46e, extending beyond the width of handle stem 46f, interacting within pivot points 46c and 46d, attached to buckle 47 near an opposite edge. Positioned at a point along its length handle 46 has two elongated holes 46a and 46b, having narrow wall strips 46a-1, and 46b-1 protruding from the nominal width of handle stem 46f placed adjacent to protuberances 47a and 47b. With handle 46 in a first closed position handle stem 46f, cooperating with the two protuberances 47a and 47b causes inward compression of the narrow wall strips sides 46a-1 and 46b-1, in cooperation with elongated holes 46a and 46b, thereby securing the handle within the aforementioned protuberances.

At a lower point, buckle 47 is positioned and tangs 41 and 44 are inserted and secured within buckle 47. Handle 46 is rotated upward to connect with buckle protuberances 47a and 47b, so that handle 46 is in a stored position overlaying a portion of web guides 38 and 39.

FIG. 13. The upper portions of both webs are required to be connected laterally to offer protection against separation in the event of a sudden deceleration. Connecting members are therefore provided on both sleeves topside. Set on an upper portion of sleeve 32 connector 34 having an open end 34c, mounted such that open end 34c is opposite and facing an attached insert member 35, attached to sleeve 33.

Insert member 35 is inserted into connector 34, causing a spring like action to occur at two protruding members 35a and 35b, having a separated extension 35e, terminating in finger grips 35c and 35d, being forced inward through interaction with contoured edge members 34a and 34b, and spring back to their normal position once inserted, engaging within a recessed portion of 34a and 34b locking insert member 35 in place within connection 34. Sleeves 32 and 33, and by extension web guides 38 and 39 are now connected together. With both upper and lower connections made, web 1 and 1a are in a closed secured position around a child strapped within a safety seat.

To remove a child from within the safety seat the upper connection 34 and 35 are disconnected by removing insert member 35 from connector 34. Finger grips 35c and 35d are squeezed together to separate protrusions 35a and 35b from within the recessed areas 34a and 34b. Insert member 35 is now withdrawn from connector 34, thereby separating sleeves 32 and 33, together with web guides 38 and 39.

At a lower connection handle 46 is rotated away from an overlaying position over sleeves 32 and 33, and web guides 38 and 39, allowing tangs 41 and 44 to be extracted from buckle 47 by pressing in a push button as provided by a conventional seat harness. It will be noted that the push button set within the buckle cannot be accessed and operated with the handle in a closed position offering a further advantage by resisting opening by a child.

Handle 46 being rotated to a lower point, attached to buckle 47, is grasped and pulled further in a downward direction, such that buckle 47 is pulled away from the previously described seat depression, toward an outer lower edge of a seat. Buckle 47, with handle 46 acting as a cantilever, is positioned and stored at a seat edge, away from interference with the child, yet available for grasping when next required. With connection 34 and 35 separated, and a lower connection separated at buckle 47 the actions remaining to remove a child from within a seat are exactly as described and set out within the aforementioned preferred embodiment narrative. Reference is hereby made to FIG. 2 containing numerals 8 and 9, to describe metallic strips, and numeral 10, to describe a safety seat. A combined sleeve 32, and web guide 38 is inverted as it is lifted free of a child and moved toward the outside edge of seat 10. Sleeve 32, with attached magnet 36, now being inverted or turned over is positioned over metallic strip 8, magnet 36 is attracted to, and makes contact thereby attaching sleeve 32 and web guide 38 to the side of seat 10. Similarly sleeve 33 and combined web guide 39, is inverted and is positioned over metallic strip 9 magnet 37 is attracted to, and makes contact thereby attaching sleeve 33 and web guide 39 to the side of seat 10.

FIG. 14, included for reference, is provided to illustrate a sleeve, for example, 32, may be separated longitudinally, and by means of a natural hinge to open into two connected parts, and to close around a web, secured by a flange extension 32w and 32w-1 by spaced apart bulbous members 32x passing through spaced apart holes 32y in a tight fitting relationship, so as to reestablish the continuity of the sleeve 32. Thus a sleeve may be opened along its length to be fitted to a web and not require threading through.

The particular embodiments of the invention described above for the purpose of disclosing and illustrating the principals involved, are not intended to put limitations on this invention.

It may be apparent to those skilled in the art that various changes may be made without departing from the spirit and principles of the invention.

What is claimed is:

1. A child's safety seat assembly comprising: first and second sleeves placed over an upper portion of a web harness, including a latchable connector to selectively couple said first sleeve to said second sleeve, including a magnet set within a plinth attached to each of said first and second sleeve thereon;
   a handle positioned on a lower portion of said web harness having a first end anchor attachment to a buckle assembly thereof, and a second end overlaying an upper portion of said web harness, including two metallic discs set thereon;
   a web clamp adjustably attached to said lower portion of said web harness, including a connection to a tang for insertion into said buckle assembly;
   a metallic strip embedded within opposing lateral sides of said safety seat.

2. The child's safety seat according to claim 1, wherein said latchable connector further comprising a circular wall member set upon said first sleeves having a connection strap, and having a first end attached to said second sleeve including a circular portion on a second end, whereby the connection strap is inserted through an open area, together with the circular portion inserted into the circular wall member thereby connecting both first and second sleeves in a first coupled position, and wherein a second uncoupled position whereby said first and second sleeves are separated.

3. The child's safety seat according to claim 2, wherein a planer member is contained within the circular portion, retracted in a first position, and extended to a second position thereby engaging within adjacent slots provided on each side of said circular wall member, thereby providing a coupled and uncoupled relationship with the circular wall member.

4. The child's safety seat according to claim 1, whereby when said first and second sleeves are in a second uncoupled position, each said first and second sleeve may be repositioned and inverted toward an adjoining lateral safety seat edge, whereby said magnet set and said metallic strips are attracted and fasten in releasable attachment, thereby maintaining the web harness clear of an interior of said safety seat.

5. The child's safety seat according to claim 1, wherein said handle rotatably connected to said buckle assembly, in a first, closed position said handle overlays said upper portion of said web harness such that said metallic discs attached to the handle are positioned for releasable attachment to said magnet set within said plinths attached to said first and second sleeves.

6. The child's safety seat according to claim 5, whereby an upper outer edge of said handle is surrounded by an ascending flange enclosing a portion of said magnet within said plinths such as to contain and restrict lateral movement, thereby providing a secondary containment mechanism to prevent lateral separation of said first and second sleeves.

7. The safety seat according to claim 5, wherein when in a second, rotated position, said handle provides the means to grasp and manipulate the buckle assembly away from an original position to an alternate position whereby the buckle assembly, with the extended handle acting as a cantilever balance, is positioned near an edge of a bottom outer edge of said safety seat, providing a storage position clear of said safety seat's lower surface, offering a grasping and manipulating opportunity to reposition the buckle assembly back to its original position.

8. A child's safety seat within a motor vehicle comprising;
a seat backrest extending upward from a seat bottom, together with an adjoining side wing positioned each side of said safety, a pair of laterally spaced apart web members, supported on one end from said seat backrest at an upper position, and terminating at a lower position near said seat bottom;
first and second sleeves enclosing an upper portion of each said spaced apart web members, said first and second sleeves each include a connecting member to selectively couple or uncouple one sleeve to the other;
further, said first and second sleeves each include a first pair of magnets attached to a lower portion of each said sleeve, and a second pair of metallic strips attached to each said side wing;
a tether strap end connected at a first anchor location to said seat bottom, and a second end terminating at a buckle, said buckle includes a pivotally connected handle attached thereon.

9. A child's safety seat according to claim 8, wherein said first sleeve is fitted with a first element of said connecting member comprising a circular wall member set upon said first sleeve, having an open area adjacent to a corresponding second element of said connecting member attached to said second sleeve, including a planer member terminating in a circular member, orientated toward and opposite said circular wall member.

10. A child's safety seat according to claim 9, wherein said circular member is inserted and closely confined within said circular wall member to provide a coupled relationship, said circular member, on being removed from said circular wall member provides an uncoupled relationship, so that said first and second sleeves, and by extension, both said spaced apart web members, may be selectively coupled or uncoupled.

11. A child's safety seat according to claim 10, wherein said circular member has an attached slide element movable between a first retracted position and a second extended position whereby said slide element can be selectively engaged or retracted providing a means to lock, or unlock said circular member within said circular wall member.

12. A child's safety seat according to claim 8, whereby when said first and second sleeves are in said uncoupled position, each said first and second sleeve may be repositioned toward said adjoining side wing, whereby said pair of magnets engage with said pair of metallic strips joining said pair of magnets and metallic strips in releasable attachment, thereby maintaining said first and second sleeves, and by extension, said spaced apart web members, stored in close proximity against said adjoining side wings, and clear of said seat backrest.

13. A child's safety seat according to claim 8, wherein when said pivotally connected handle is in a first closed vertically inclined position, a portion of said pivotally connected handle overlays a central portion of said buckle, such as to cover a release button centrally located within said buckle, thereby preventing a child gaining access to and inadvertently operating said release button.

14. A child's safety seat according to claim 8, wherein when said pivotally connected handle is in a first closed vertically inclined position, a section of said pivotally connected handle includes compressible member, that overlay an upper edge portion of said buckle, and interact with corresponding protrusions set upon said buckle's upper edge, said compressible members snap into said protrusions, cooperating to provide a releasable connection.

15. A child's safety seat according to claim 8, wherein when said pivotally connected handle when rotated to a second horizontally inclined open position, provides an opportunity to grasp and manipulate said buckle away from an original position to an alternate position whereby said buckle, with said pivotally connected handle extended and acting as a cantilever balance, captures said buckle outside the area of said seat bottom, and offers a grasping and manipulating opportunity to reposition said buckle back to said original position.

16. A child's safety seat according to claim 8, wherein when said pivotally connected handle when rotated to a second horizontally inclined open position, provides an opportunity to grasp and manipulate said buckle away from an original position to an alternate position whereby said pivotally connected handle rests upon said seat bottom's outer edge causing a frictional interface between said pivotally connected handle and said outer edge, cooperating to hold said pivotally connected handle and said buckle in place, and captures said buckle near a second edge of said seat bottom, and offers a grasping and manipulating opportunity to reposition said buckle back to said original position.

* * * * *